United States Patent
Le Neel et al.

(10) Patent No.: US 8,598,681 B2
(45) Date of Patent: Dec. 3, 2013

(54) TEMPERATURE SWITCH WITH RESISTIVE SENSOR

(75) Inventors: Olivier Le Neel, Singapore (SG); Ravi Shankar, Singapore (SG)

(73) Assignee: STMicroelectronics Pte Ltd., Singapore (SG)

(*) Notice: Subject to any disclaimer, the term of this patent is extended or adjusted under 35 U.S.C. 154(b) by 17 days.

(21) Appl. No.: 13/341,286

(22) Filed: Dec. 30, 2011

(65) Prior Publication Data

US 2013/0168815 A1 Jul. 4, 2013

(51) Int. Cl.
*H01L 29/00* (2006.01)
*H01L 21/20* (2006.01)

(52) U.S. Cl.
USPC ............ 257/536; 257/E27.016; 257/E27.035; 257/E21.004; 438/385

(58) Field of Classification Search
CPC .. H01L 27/0802; H01L 28/20; H01L 29/8605
USPC .................. 257/536, 537, E27.016, E27.035, 257/E21.004; 438/381, 382, 384, 385
See application file for complete search history.

(56) References Cited

U.S. PATENT DOCUMENTS

| | | | | |
|---|---|---|---|---|
| 2,383,450 | A | * | 8/1945 | Coleman ........................ 324/438 |
| 2,463,480 | A | * | 3/1949 | Fenn et al. ..................... 324/101 |
| 5,694,147 | A | * | 12/1997 | Gaalema et al. ............... 345/101 |
| 5,733,669 | A | * | 3/1998 | Veyhl et al. .................... 428/698 |
| 8,400,257 | B2 | | 3/2013 | Lim et al. |
| 8,436,426 | B2 | | 5/2013 | Le Neel et al. |
| 2007/0013389 | A1 | * | 1/2007 | Grudin et al. ................. 324/691 |
| 2010/0073122 | A1 | | 3/2010 | Le Neel et al. |
| 2012/0049323 | A1 | | 3/2012 | Ng et al. |

OTHER PUBLICATIONS

Hrubesh at al., "Thermal properties of organic and inorganic aerogels", 1993, J. Mater. Res., vol. 9, No. 3, pp. 731-738, Mar. 1994.*
Sumirat et al., "Theoretical consideration of the effect of porosity on the thermal conductivity of porous materials", 2006, J Porous Mater vol. 13, pp. 439-443, Dec. 2006.*
"TMP300: 1.8V, Resistor-Programmable Temperature Switch and Analog Out Temperature Sensor in SC70," Texas Instruments Incorporated, Jun. 2005, revised Jan. 2011, 18 pages.
"MCP9509/10: Resistor-Programmable Temperature Switches," Microchip Technology Inc., 2008, 28 pages.

* cited by examiner

*Primary Examiner* — Nikolay Yushin
(74) *Attorney, Agent, or Firm* — Seed IP Law Group PLLC (57) ABSTRACT

The present disclosure is directed to a device and a method for forming a precision temperature sensor switch with a Wheatstone bridge configuration of four resistors and a comparator. When the temperature sensor detects a temperature above a threshold, the switch will change states. The four resistors in the Wheatstone bridge have the same resistance, with three of the resistors having a low temperature coefficient of resistance and the fourth resistor having a high temperature coefficient of resistance. As the temperature increases, the resistance of the fourth resistor will change. The change in resistance of the fourth resistor will change a voltage across the bridge. The voltage across the bridge is coupled to the comparator and compares the voltage with the threshold temperature, such that when the threshold temperature is exceeded, the comparator switches the output off.

23 Claims, 8 Drawing Sheets

TEMPERATURE SWITCH WITH RESISTIVE SENSOR

BACKGROUND

1. Technical Field

The present disclosure is directed to a temperature switch with a resistive sensor, and more particularly, a sensor that includes a Wheatstone bridge having three resistors each having a low temperature coefficient of resistance and a fourth resistor with a high temperature coefficient of resistance.

2. Description of the Related Art

Many electronic devices have temperature ranges within which they operate. If the device is in an environment that is outside of the temperature range, the reliability of the device is affected, such that the device may cease to operate correctly or at all.

Smart phones, such as iPhones, Blackberries, and other cellular telephones or mobile devices, are examples of devices that have a temperature range for optimum performance. There are recommended ranges for operating temperatures and storage temperatures. The recommended operating temperatures are in the range of 0 and 75 degrees Celsius. The recommended storage temperatures are in the range of −20 and 45 degrees Celsius. If the smart phone is in an environment that is outside of these ranges or the phone itself heats up to a temperature outside of these ranges, the phone may stop charging, dim the display, experience a decrease in cellular signal, disable location services, or disable the camera flash. In some phones a temperature warning screen will appear and indicate that the phone needs to cool down before further use.

In order to prevent damage to the phone or other electronic device from heat, temperature sensors are integrated into the phones and devices. For example, in the smart phones, a temperature switch can trigger a safe mode when any of the extreme borders of optimal temperature ranges are reached. The safe mode can shut the phone off or limit power consumption to decrease the operating temperature of the phone.

A variety of temperature switches are used to turn off the phone or device or turn off a component of the phone or device if one of the border temperatures is detected. For example, a thermocouple may be included on a printed circuit board of the phone or device to detect a change in temperature. The thermocouple is configured to produce a voltage proportional to a temperature difference between two conductors. One of the limitations of the thermocouple is accuracy and precision.

Figure 1:
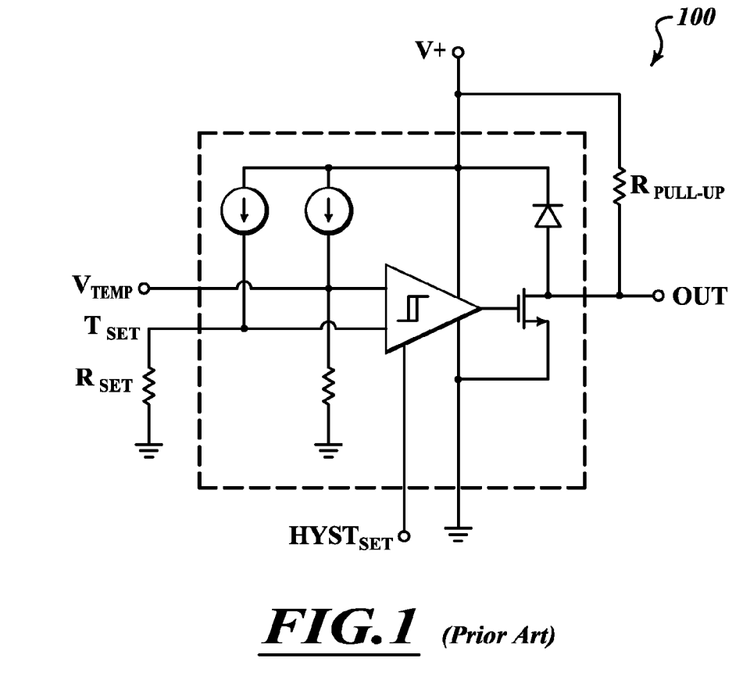
FIGS. 1 are 2 are circuit diagrams of known temperature switches.
Figure 2:
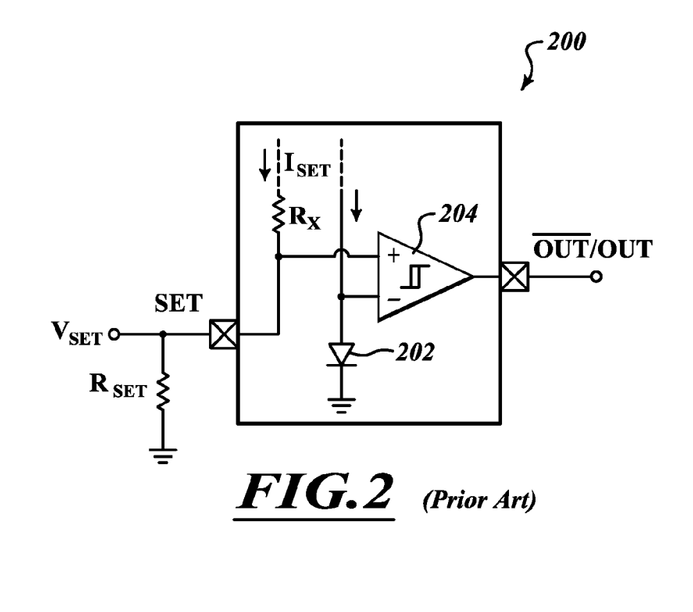

FIGS. 1 and 2 are existing solutions of circuitry used for temperature switches where a threshold temperature value is an input into circuitry separate from a sensor that detects the temperature. FIG. 1 is a resistor-programmable temperature switch 100 made by Texas Instruments and referred to as TMP300. The temperature switch 100 uses an external set resistor $R_{SET}$ to program a trip temperature for the output, OUT. The temperature is sensed in a sensor separate from the temperature switch 100 and provided to the temperature switch 100 as an electrical signal, $V_{TEMP}$. The signal $V_{TEMP}$ is compared to the set resistor value representing a threshold temperature $T_{SET}$. In this switch, the threshold temperature values are input into the electronics and not into the sensor.

FIG. 2 is user programmable temperature switch 200 that can be programmed with a single external resistor $R_{SET}$, which is made by Microchip and referred to as MCP9510. This switch 200 is capable of triggering for temperatures between −40 and 125 degrees Celsius. The user selects a resistance of $R_{SET}$, to program a threshold temperature at which to trigger the temperature switch 200. A voltage $V_{SET}$ across $R_{SET}$ is compared to an internal thermal diode 202 that is configured to sense the temperature. A voltage of the thermal diode 202 is compared to the voltage $V_{SET}$ across $R_{SET}$ with a comparator 204. If the voltage of the thermal diode 202 exceeds $V_{SET}$ then an output OUT will be activated.

As with the temperature switch 100 in FIG. 1, the temperature switch 200 in FIG. 2 requires the temperature threshold value to be input into electronics adjacent to the temperature switch and is not provided integrally with the temperature switch. Both of these temperature switches 100, 200 are separate components from the other components of a telephone or other electronic device, such as a processor, a mother board, and a crystal oscillator. The temperature switches 100, 200 plus additional external resistors must be attached to the printed circuit board onto which the processor and other components are attached.

BRIEF SUMMARY

The present disclosure is directed to forming a temperature sensor switch that has the threshold temperature stored within the sensor and that performs an internal comparison of the threshold temperature to the ambient temperature. An output of the temperature sensor switch is used as on/off switch that depending on temperature measured and stored.

In one embodiment, the temperature sensor switch is incorporated with active circuitry of a semiconductor device, such as that for a microprocessor or micro controller. The temperature sensor switch includes a Wheatstone bridge having four resistors, where three of the resistors have a low temperature coefficient of resistance and the fourth resistor has a high temperature coefficient of resistance. The fourth resistor is configured to detect an ambient temperature in which the device is operating. A resistance of the fourth resistor is selected to respond to the threshold temperature. Accordingly, at least the fourth resistor of the Wheatstone bridge is formed at or near the last metal level of the device. Being positioned closer to the environment will make the temperature sensor more precise.

In addition, the comparison of the threshold temperature to the ambient temperature is performed within the temperature sensor switch and not in separate electronics. Also, each resistor may be trimmed to allow precision resistances to be achieved within the Wheatstone bridge.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

DETAILED DESCRIPTION

In the following description, certain specific details are set forth in order to provide a thorough understanding of various embodiments of the disclosure. However, one skilled in the art will understand that the disclosure may be practiced without these specific details. In some instances, well-known structures associated with semiconductor manufacturing have not been described in detail to avoid obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale, but in many instances, do reflect actual scale and relative size between the components.

Figure 3:
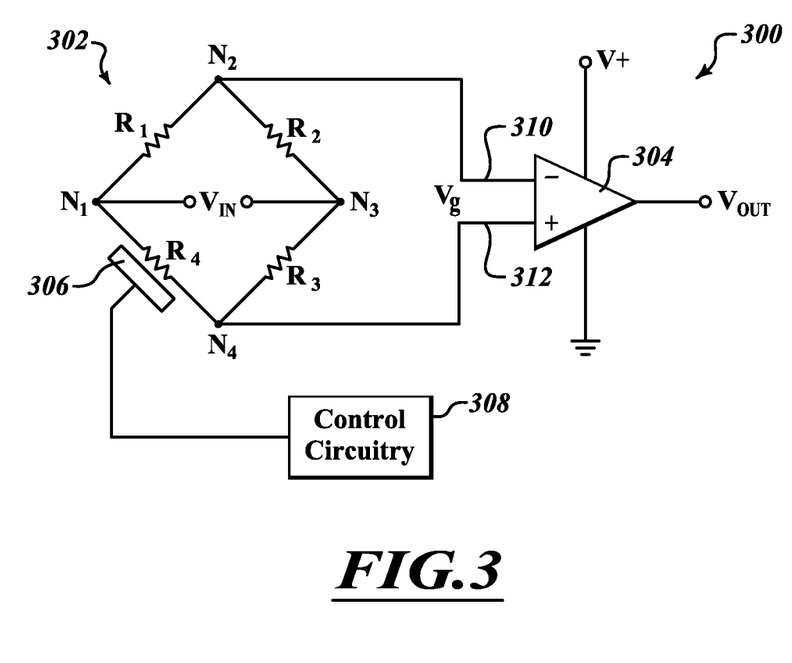
FIG. 3 is a circuit diagram of a temperature switch according to an embodiment of the present disclosure.

FIG. 3 is a circuit diagram of a temperature switch 300 formed in accordance with the present disclosure. The temperature switch 300 includes a Wheatstone bridge 302 coupled to a comparator 304. The Wheatstone bridge 302 includes four resistors R1, R2, R3, and R4. The first resistor R1 is coupled to a first node N1 and a second node N2. The second resistor R2 is coupled to the second node N2 and a third node N3. The third resistor R3 is coupled to the third node N3 and a fourth node N4. The fourth resistor R4 is coupled to the fourth node N4 and the first node N1. A voltage source, Vin is coupled between the first and third nodes N1, N3. In one embodiment, if the voltage source Vin of the Wheatstone bridge is 5 volts and the power consumed by the temperature sensor is less than 1 milliwatt.

The comparator 304 has a first input 310, a second input 312, and an output Vout. The first input 310 is coupled to the second node N2 and the second input 312 is coupled to the fourth node N4 of the Wheatstone bridge 302.

The temperature switch 300 is configured to detect a change in temperature above a threshold temperature and provide an output that can be used as a switch, i.e., on or off. The Wheatstone bridge 300 acts as a sensor to determine if the temperature reaches the threshold temperature. In particular, the first, second, and fourth resistors R1, R2, and R4 each have a low temperature coefficient of resistance and the third resistor R3 has a high temperature coefficient of resistance. The third resistor R3 is configured to change resistance when the temperature exceeds the threshold temperature.

The third resistor R3 is a thermistor, which is a resistor whose resistance varies significantly with temperature. Generally, the relationship between resistance and temperature for the thermistor is linear, such that a change in resistance is equal to a change in temperature times the temperature coefficient of resistance. See Equation 1.

$$\Delta R = k \Delta T \quad (1)$$

Where, $\Delta R$ is a change in the resistance, $\Delta T$ is a change in the temperature, and k is the temperature coefficient of resistance. If k is positive, the resistance increases with increasing temperature. If k is negative, the resistance decreases with increasing temperature.

When a ratio of the second resistor R2 to the first resistor R1 (R2/R1) is equal to a ratio of the third resistor R3 to the fourth resistor R4 (R3/R4) the Wheatstone bridge 302 is balanced and an output Vg of the bridge 302 will be zero. As the temperature of the environment or of the device in which the Wheatstone bridge 302 is incorporated changes, the resistance of the third resistor R3 will change. The change in resistance of the third resistor will cause the Wheatstone bridge to be unbalanced and the output of Vg will be non-zero. A direction of current flowing through Vg will dictate if the temperature is higher or lower than the threshold temperature.

The Wheatstone bridge 302 is extremely accurate and highly responsive to an imbalance. Very small changes in the resistance of the third resistor R3 disrupt the balance and are readily detected. Qualities of the third resistor R3 can, be selected and manufactured to provide a specific reference or threshold temperature that will trigger an imbalance of the Wheatstone bridge 302. The Wheatstone bridge 302 is programmed with the reference or threshold temperature with the qualities of the third resistor R3. This programming can be achieved by manufacturing techniques or through resistance trimming, which will be discussed in more detail below. This arrangement allows for comparison of ambient temperatures with the reference or threshold temperature programmed into the sensor (the Wheatstone bridge 302).

The temperature switch 300 measures or detects the threshold temperature and gives the electrical output Vout. The comparator 304 provides the output signal Vout when one of the border the threshold temperatures is exceeded, either high or low. For example, if the first input 310 is greater than the second input 312 the output Vout is grounded and if the second input 312 is greater than the first input 310, the output Vout is open or on. In an alternative embodiment, the temperature switch 300 may be triggered with a current when the reference or threshold temperature is detected.

The temperature switch 300 may also include one or more heaters 306 that may each be controlled by control circuitry 308. The heater 306 is configured to provide localized thermal processing to alter a resistance of an adjacent resistor. In this embodiment, the heater 306 is only shown adjacent to the fourth resistor R4. However, in other embodiments, there may be a heater adjacent to one or all of the resistors R1, R2, R3, and R4. This allows the end user to have greater control over the resistances of the resistors R1, R2, R3, and R4 and thus over the threshold temperature that triggers the temperature switch 300. For example, smart phone manufacturers may want the processor and other devices on the phone to stop operating or begin operating in safe mode if the ambient temperature exceeds 75 degrees Celsius. Operating in safe mode or shutting down the phone will help to prevent irreparable damage to the phone and the other components included on the phone while the temperature is extremely high or low.

As mentioned above, there is the single heater 306 that is positioned adjacent to the fourth resistor R4. However, more than one heater 306 can be provided to trim the other resistors R1, R2 and R3 as well, see alternative heater arrangements in FIGS. 4-10. Each heater 306 will be coupled to the control circuitry 308 or other similar control circuitry. More particularly, each heater may have its own control circuitry or all of the heaters may be coupled to one set of control circuitry. In an alternative embodiment, the first, second, and fourth resistors R1, R2, and R4 may be coupled to one set of control circuitry and third resistors R3 is coupled to another set of control circuitry. The heater 306 and the localized thermal processing will be described in more detail below with respect to FIGS. 4-10.

In one embodiment, the resistances R of the first, second, third, and fourth resistors are equal, as shown in Equation 2.

$$R=R1=R2=R3=R4 \quad (2)$$

The difference between the first, second, and fourth resistor from the third resistor being the difference in the temperature coefficient of resistance. A change of the resistance of the first, second, and fourth resistors R1, R2, and R4 is equal because each has the same low temperature coefficient of resistance. In one embodiment, the change of the resistances of the first, second, and fourth resistors during operation is zero, as shown in Equation 3.

$$\Delta_{R_1}=\Delta_{R_2}=\Delta_{R_4}=0 \quad (3)$$

A change in the output voltage Vg is determined by calculating the output voltage of the two branches of the Wheatstone bridge 302, which are each voltage dividers having the second and the fourth nodes N2, N4 as the respective output voltages. The change in the output voltage Vg is shown by Equation 4.

$$\Delta V_g \approx \frac{\Delta R_1 - \Delta R_2 + \Delta R_3 - \Delta R_4}{4R} V_{in} \quad (4)$$

When each of the resistors have equal resistances, the change in the output voltage Vg is simplified to be the change in the third resistor's R3 resistance divided by 4R times the supply voltage, Vin, as shown in Equation 5.

$$\Delta V_g = \frac{\Delta R_3}{4R} V_{in} \quad (5)$$

Accordingly, the change in the output voltage Vg is approximately equal to the change in resistance of the temperature sensitive third resistor R3, which is related to the change in temperature, as shown in Equation 6.

$$\Delta V_g \propto \Delta R_3 \propto \Delta T \quad (6)$$

In other words, the change in output voltage Vg is proportional to the change in the temperature. Accordingly, the temperature switch 300 can provide a precise indication of the a change in the temperature past the threshold temperature.

The temperature switch 300 may be formed in a stand-alone device, i.e., formed on a single die, packaged, and configured to be added to a printed circuit board. For example, the temperature switch 300 package could be included on the printed circuit board of a smart phone and coupled to other circuitry in the phone so that when the temperature switch 300 detects a threshold temperature the other circuitry can be shut down or otherwise prepare for the extreme temperatures.

Figure 5:
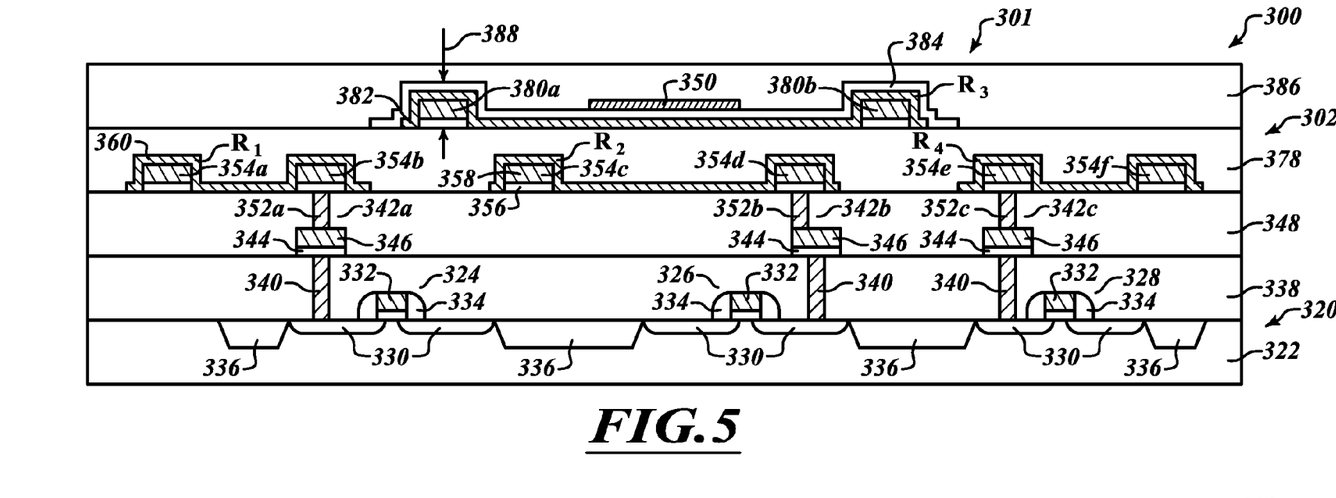
FIG. 5 is a cross-sectional view through cross section 5-5 of FIG. 4.

In an alternative embodiment, the temperature switch 300 is incorporated on or integrated with a die having active circuitry 320 as shown in FIG. 5. The active circuitry 320 could be a microprocessor, the control circuitry 308 for trimming the resistors R1, R2, R3, or R4, or other electronic devices that could be utilized with the temperature switch. In this embodiment, a single heater 350 is provided adjacent to the third resistor R3.

By incorporating the temperature sensor into the same device that performs the comparison or compensation, space is saved on the printed circuit board. In addition, the temperature sensing resistor, i.e., the third resistor R3 can be controlled with precision by the user through the heater 350. This control allows the user to more precisely tune the temperature switch 300 for their particular application.

As will be described in more detail below, in one embodiment, the temperature switch 300 incorporates thermistor technology using two metal levels to form the first, second, and fourth temperature insensitive resistors R1, R2, and R4 and the third temperature sensitive resistor R3. As mentioned above, the third temperature sensitive resistor R3 has a high temperature coefficient of resistance, which means the resistance greatly changes with small changes in temperature. The change may be positive or negative. A negative temperature coefficient of resistance occurs when the thermal conductivity of the resistor increases with a rise in temperature, i.e., the resistance decreases. A positive temperature coefficient of resistance occurs when the resistance increases with an increase in temperature. The temperature insensitive resistors R1, R2, and R4 have ultra low temperature coefficients of resistance, which indicates that a resistance of these resistors will change little to none at all as the temperature changes.

Figure 4:
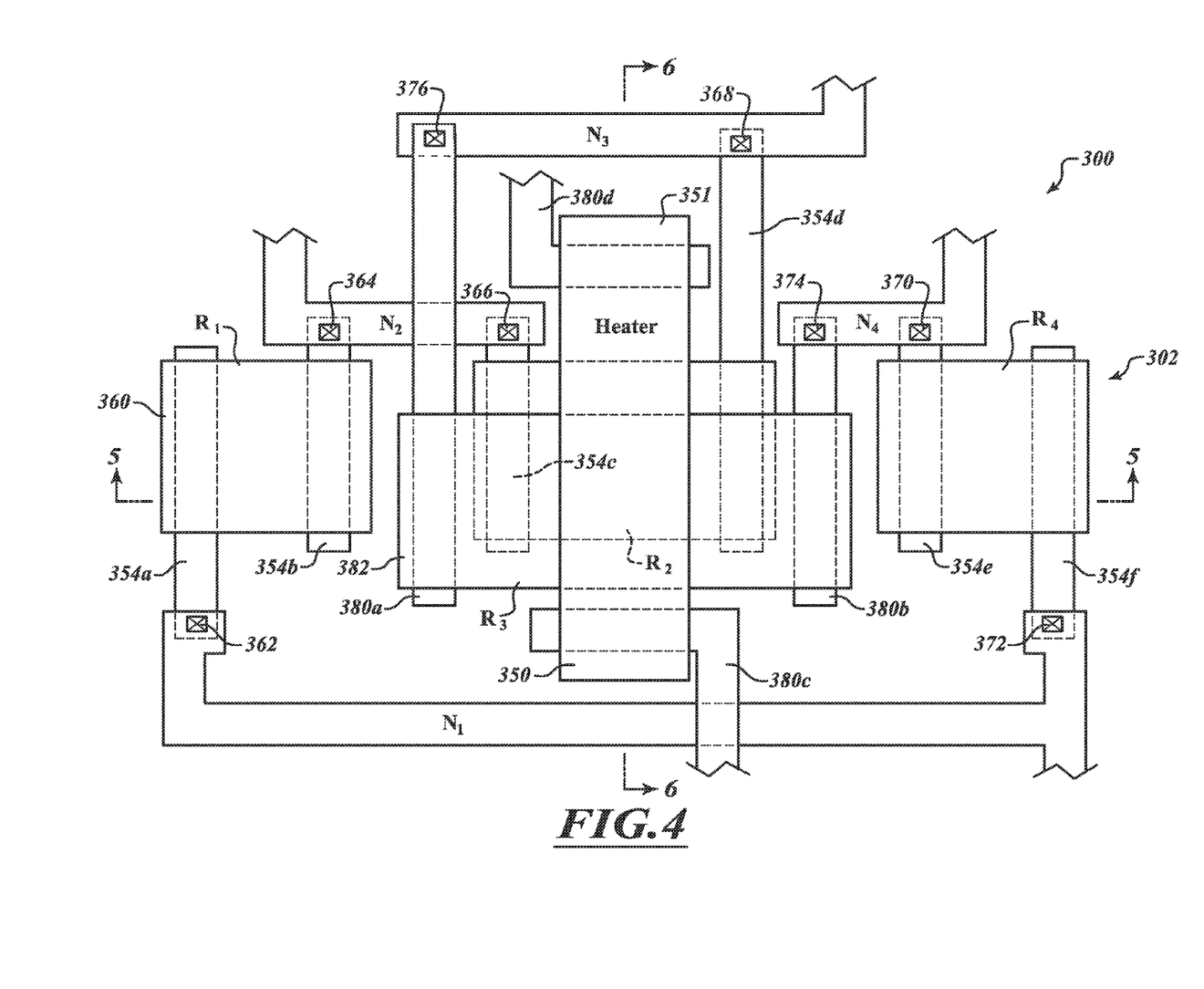
FIG. 4 is a top down view of a Wheatstone bridge of a temperature switch formed in accordance with an embodiment of the present disclosure.
Figure 6:
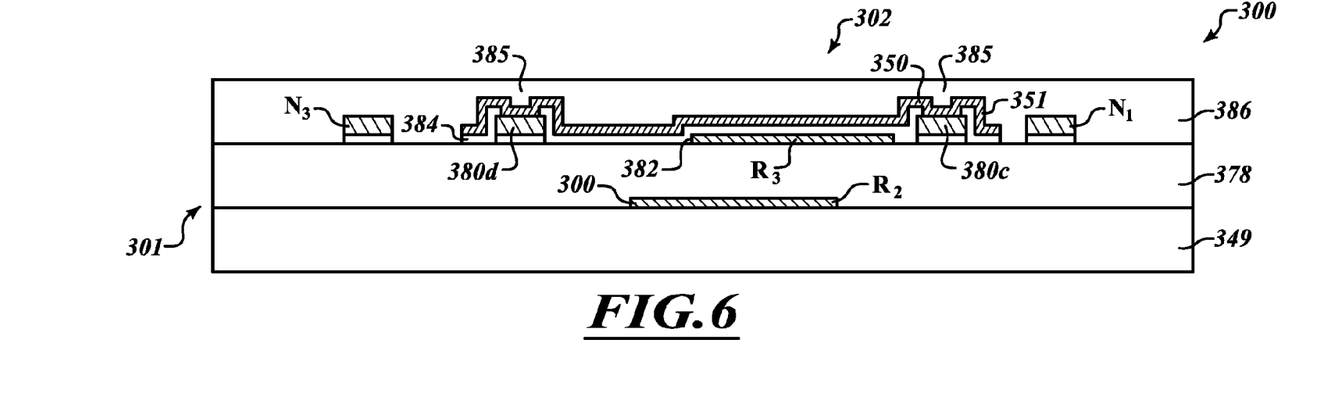
FIG. 6 is a cross-sectional view through cross section 6-6 of FIG. 4.

FIG. 4 is a simplified top down view of an alternative arrangement of the temperature switch 300 of FIG. 3 having the Wheatstone bridge 302 with the heater 350 positioned adjacent to the third resistor R3, formed in accordance with an embodiment of the present disclosure. FIG. 5 is a cross-sectional view of the Wheatstone bridge 302 taken through cross section 5-5 of FIG. 4. FIG. 5 includes active circuitry 320, which is not shown in the top down view of FIG. 4. FIG. 6 is a cross-sectional view of the Wheatstone bridge 302 taken through cross section 6-6 of FIG. 4. For simplicity, the active circuitry 320 of FIG. 5 is not shown in FIG. 6.

The Wheatstone bridge 302 is formed above and coupled to the active circuitry 320 formed in and above a semiconductor substrate 322. The temperatures switch 300 is part of a semiconductor device 301 that includes a plurality of other electronic devices (not shown in the figures) that are formed in conjunction with transistors 324, 326, 328 and the Wheatstone bridge 302 to make the semiconductor device 301 operational. The substrate 322 may be monocrystalline silicon, gallium-arsenide, or an alternative suitable material onto which the device may be formed.

The active circuitry 320 includes a first, a second, and a third transistor 324, 326, 328 that each have source/drain regions 330, a gate 332, and sidewall spacers 334 adjacent to the gate 332. The first, second, and third transistors 324, 326, 328 are isolated by various shallow trench isolation structures 336. Other suitable isolations structures may also be used.

A first interlevel dielectric layer 338 overlies the first, second, and third transistors 324, 326, 328. The first interlevel dielectric layer 338 may be a series of deposited layers of various oxides or other insulating material, such as a laminated layer or multiple layers. For example, the first interlevel dielectric may be a premetal dielectric layer, such as borophosphosilicate glass (BPSG), pure silicon dioxide, and tetraethyl orthosilicate (TEOS). The first interlevel dielectric layer 338 may be planarized by a chemical mechanical polish or other technique to remove uneven topology caused by the underlying structures, such as the first, second, and third transistors 324, 326, 328.

A plurality of first conductive plugs 340 extend through the first interlevel dielectric layer 338 and contact the source/drain regions 330 of the first, second, and third transistors 324, 326, 328. A barrier layer (not shown) may be formed as a protective barrier to line the first conductive plugs 340 prior to forming a conductive material in the first conductive plugs. For example, the barrier layer may be titanium tungsten or titanium nitride and the conductive material may be tungsten. The conductive material in the first conductive plugs 340 may be tungsten, aluminum, copper, or other suitable material.

A plurality of first interconnect structures 342a, 342b, 342c (collectively 342) couple to the conductive plugs 340. The first interconnect structures 342 are conductive layers, such as metal or polysilicon that carry electrical signals throughout the semiconductor device 301.

In one embodiment, the first interconnect structures 342 are formed by depositing a barrier layer 344 on the first interlevel dielectric layer 338 and then depositing a metal layer 346 on the barrier layer 344. Then the barrier layer 344 and the metal layer 346 are patterned and etched to form the first interconnect structures 342. The first interconnect structures 342 are formed simultaneously with a plurality of other first interconnect structures that are not visible in these views.

The first interconnect structures 342 may be formed using known metal formation techniques. For example, the barrier layer 344 is a 500 to 1,000 angstrom layer of titanium. Other conductive materials may be substituted for or combined with titanium, such as titanium nitride, titanium tungsten, chromium, tantalum nitride, and tantalum silicon nitride. The metal layer 346 may be formed with materials such as aluminum, aluminum copper alloys, copper, or other suitable conductive materials. The metal layer 346 may be formed to have a thickness between 2,000 angstroms and 1 micron. The metal layer 346 is significantly larger than the barrier layer 344. In one embodiment, the barrier layer 344 protects the metal layer 346 from diffusion from other elements in the first interlevel dielectric layer 338 and other layers in the semiconductor device 301.

A second interlevel dielectric layer 348 overlies the first interconnect structures 342 and may be planarized as described above with respect to the first interlevel dielectric layer 338 using a chemical mechanical polish or other suitable technique. The second interlevel dielectric layer 348 may be an insulating material, such as silicon dioxide, TEOS, or BPSG. The first and second interlevel dielectric layers 338, 348 may include a plurality of layers, such as multiple depositions of the same material or layers of different dielectric materials. The first and second interlevel dielectric layers 338, 348 also isolate the transistors or other components from the Wheatstone bridge 302 and integrated first heater 350 and other devices formed in the semiconductor device 301. In other embodiments, additional isolation layers are formed over the second interlevel dielectric layer 348 to further isolate the Wheatstone bridge 302 from the active circuitry 320 of the device 301.

As shown in FIG. 4, the first heater 350 and the resistors R1, R2, R3, and R4 are formed a rectangular components. In other embodiments, these features may have other shapes. For example, the first heater 350 may have a serpentine shape. In addition, the first, second, and fourth resistors are formed on a different metal level from the third resistor. However, in alternative embodiments, the first, second, third, and fourth resistors may be formed on the same metal level.

A plurality of second conductive plugs 352a, 352b, 352c (collectively 352) extend through the second interlevel dielectric layer 348 to couple the first interconnect structures 342 to respective ones of a plurality of second interconnect structures 354a-f (collectively 354). A first one of the second interconnect structures 354a is not coupled to one of the first interconnect structures 342 in this cross section. A second one of the second interconnect structures 354b couples to the first interconnect structure 342a through the second conductive plug 352a. A third one of the second interconnect structures 354c is not coupled to one of the first interconnect structures 342 in this cross section. A fourth one of the second interconnect structures 354d couples to the first interconnect structure 342b through the second conductive plug 352b. A fifth one of the second interconnect structures 354e is coupled to the first interconnect structure 342c through the second conductive plug 352c. A sixth one of the second interconnect structures 354f is not coupled to one of the first interconnect structures 342 in this cross section.

Each of the second interconnect structures 354a-f are formed with known manufacturing techniques and can include a barrier layer 356 on the second interlevel dielectric layer 348 and a metal layer 358 on the barrier layer 356. Once the metal layer 358 and the barrier layer 356 are patterned and etched to form the second interconnect structures 354a-f, a first resistive layer 360 is formed.

The first resistive layer 360 is a thin film layer laterally connecting respective ones of the second interconnect structures 354a-f. In particular, the first resistive layer 360 laterally connects all of the second interconnect structures 354 before the first resistive layer 360 is patterned and etched into the first, second, and fourth resistors, R1, R2, and R4. In particular, the first resistor R1 connects the first and the second ones of the second interconnect structures 354a, 354b. The second resistor R2 connects the third and fourth ones of the second interconnect structures 354c, 354d. The fourth resistor R4 connects the fifth and sixth ones of the second interconnect structures 354e, 354f. In alternative embodiments, the third resistor R3 may be formed on the same metal level as the first, second, and fourth resistors R1, R2, R4.

The first resistive layer 360 is formed by deposition of a thin film of a resistive metal or other resistive material over the second interlevel dielectric 348 and the second interconnect structures 354a-f. The first resistive layer 360 directly contacts the second interconnect structures 354 on the tops and sidewalls. This eliminates the need to form vias to connect the first resistive layer to the next metal or resistive layer, which makes the semiconductor device smaller overall. This significantly reduces manufacturing time and costs by reducing the processing steps and reducing the amount of materials used to complete the semiconductor device 301. Also, the overall vertical and horizontal dimensions of the semiconductor device are decreased.

The first resistive layer 360 remains on sidewalls of the second interconnect structures 354a-f. In some other embodiments, vertical portions of the first resistive layer 360 do not remain in the final product. Their existence depends on how the manufacturer decides to pattern and form the first resistive layer 360 and how connections 362, 364, 366, 368, 370, and 372 for the nodes N1, N2, N3, and N4 are formed, see FIG. 4.

An etch to remove portions of the first resistive layer 360 may over etch and remove some amount of the exposed second interlevel dielectric 348. The over etch may occur to ensure the excess portions of the first resistive layer 360 are removed, thereby avoiding shorting adjacent ones of the second interconnect structures 354a-f that are not intended to be electrically connected.

In one embodiment, an antireflective coating (not shown) can overlie the first or second interconnect structures 342, 354. The antireflective coating is optional and can be omitted. A protective coating (also not shown) may be included on the antireflective coating or directly on the first or second interconnect structures 342, 354 to protect a top surface of the first or second interconnect structures from over etch.

Leaving the first resistive layer 360 on the sidewalls protects the second interconnect structures 354a-f from under etch when the first, second, and fourth resistors R1, R2, R4 are defined and portions of the second interlevel dielectric 348 are reexposed. If there is misalignment when defining the first resistive layer 360, such that the pattern does not cover an entire top surface of one of the second interconnect structures 354, the protective layer (not shown, but discussed above) can be useful in preventing the etch chemistry from damaging the second interconnect structures 354a-f.

Numerous materials may be utilized to form the first resistive layer 360, including, but not limited to, metallic films like chromium silicon, nickel chromium, tantalum nitride, tantalum aluminum, titanium nitride, and platinum, to name a few. These materials also offer good performance as resistors. These materials can form a wide range of sheet resistances, have good tolerance, are easily reproducible, can be formed to have a low temperature coefficients of resistance, have linear behavior, and have low parasitic capacitance values. These resistive materials are generally formed by an evaporation technique, a sputter technique, or a chemical vapor deposition technique.

One example of a material that can be used to form the first resistive layer 360 having a low temperature coefficient of resistance is chromium silicon, where there is more chromium than silicon. A chromium rich low temperature coefficient of resistance may be a chromium silicon film that includes 60-80% chromium.

The first resistive layer 360 may be formed to have a thickness of less than 100 angstroms. In other embodiments, the first resistive layer may have a thickness in the range of 50 and 500 angstroms. With these small thicknesses, the first resistive layer can be formed between adjacent ones of the second interconnect structures 354a-f without negatively impacting the interlevel dielectric planarization of subsequent levels in the semiconductor device 301.

After the first resistive layer 360 is deposited, a hard mask may be deposited to permanently protect the thin film resistors R1, R2, R4. For example, a titanium tungsten barrier layer may be deposited. The hard mask will protect the thin film resistor from chemically reacting with subsequent insulation, interlevel dielectric, or passivation layers. In locations where vias and conductive plugs are formed, the hard mask can be removed with a wet etch, such as with hydrogen peroxide.

In other embodiments, a plurality of heaters 402, 404, 406 are formed adjacent to the resistors R1, R2, R4 after the resistors are formed. The heaters are formed to allow the user to control the resistance values of the resistors R1, R2, R4, see FIGS. 9 and 10.

A third interlevel dielectric layer 378 is formed over the first, second, and fourth resistors R1, R2, R4. The third interlevel dielectric layer 378 may be planarized to remove uneven topology. The third dielectric layer 378 may be a plurality of layers of different materials to thermally insulate the first, second, and fourth resistors R1, R2, R4 from the third resistor R3, which is the temperature responsive sensor.

In one embodiment, the third interlevel dielectric layer 378 is selected to have a low thermal conductivity so that heat from the first, second, and fourth resistors R1, R2, R4 is not easily transferred to third thermally responsive resistor R3 above the first, second, and fourth resistors R1, R2, R4. In one embodiment, the third interlevel dielectric layer 378 is a silicon oxide layer having a thermal conductivity of about 1 W/m/K. Other suitable materials may be used for the third interlevel dielectric layer 378.

A plurality of third interconnect structures 380a, 380b, 380c, 380d (collectively 380) are formed on the third interlevel dielectric layer 378. The third interconnect structures 380 are formed as described above with respect to the first and second interconnect structures. A second resistive layer 382 is deposited over the third interconnect structures 380 and over the third interlevel dielectric 378. The second resistive layer 382 is patterned and etched to form the third resistor R3 of the Wheatstone bridge 302. The second resistive layer 382 may be formed of similar materials, only having different concentrations as the materials in the first, second, and fourth resistors R1, R2, R4. In particular, the third resistor R3 will have a different relative ratio of elements to cause a higher temperature coefficient of resistance than the first, second, and fourth resistors R1, R2, R4. For example, the second resistive layer 382 may be a chromium silicon film with a higher percentage of silicon, such as silicon in the range of 70 to 80%.

A first thermally conductive dielectric layer 384 is formed over the third resistor R3 to separate the third resistor R3 from the first heater 350. The dielectric layer 384 may be conformally deposited over the third resistor R3 and the third interlevel dielectric 378. In one embodiment, the dielectric layer 384 is patterned and etched with the third resistor R3. Alternatively, the dielectric layer 384 is formed after the third resistor R3 to only overly the third resistor R3 and no portions of the third interlevel dielectric 378.

The first dielectric layer 384 is thermally conductive and electrically insulating material. In one embodiment, the dielectric layer 384 is silicon nitride having a thickness of about 100 nm and a thermal conductivity of approximately 20 W/m/K. In an alternative, embodiment the dielectric layer 384 is a layer of silicon carbide having a thermal conductivity of 150 W/m/K. Other thermally conductive materials include, but are not limited to, other glasses, graphene, air, or diamond. The first dielectric material 384 may also be made from a material that becomes more conductive to heat as the average temperature increases.

When the first heater 350 becomes hot, the first thermally conductive dielectric layer 384 conducts heat from the first heater 350 to the third resistor R3. For this reason, the first thermally conductive dielectric layer 384 is formed of a dielectric material selected to have high thermal conductivity. Because the first thermally conductive dielectric layer 384 is thin and conducts heat very well, heat can be efficiently conducted from the first heater 350 to the third resistor R3.

The first heater 350 is formed from a thin film layer 351 formed over the third resistor R3. The thin film layer 351 is patterned and etched to form the first heater 350. In this embodiment, the first heater 350 laterally connects two of the third interconnect structures 380c, 380d, which are shown in FIG. 4 and are not visible in the cross-section of FIG. 5. However, the third interconnect structures 380c, 380d are shown in FIG. 6. The first heater 350 only covers a central portion of the third resistor R3 in this embodiment; however, in other embodiments a width of the first heater 350 may cover more area of the third resistor R3. In one embodiment, the heater is a 20 nanometer thick tantalum aluminum layer.

In one embodiment, the first and second resistive layers 360, 382 are chromium silicon films, each having different percentages of chromium and silicon and each being 10 nanometers thick with a 30 nanometer cap of silicon nitride. In an alternative embodiment, the first and second resistive layers 360, 382 may be formed by depositing multiple thin film layers in succession. A stack of thin film layers combine the elementary properties of the individual layers. The first and second resistive layers 360, 382 may be deposited with multiple deposition steps in a single physical vapor deposition machine, without a break in vacuum conditions.

In one embodiment, the first and second resistive layers 360, 382 are formed by a blanket physical vapor deposition (PVD) process, for example sputtering. However, other processes are available for forming the thin film resistors including evaporation and other suitable thin film processes. The first and second resistive layers 360, 382 are then patterned and etched to the desired shape for each resistor, see FIG. 4. The first and second resistive layers 360, 382 are formed with a portion on the second and third interlevel dielectric layers 348, 378, respectively and a portion contacting one or more of the second interconnect structures 354 and third interconnect structures 380, respectively.

In other embodiments, each of the resistive layers 360, 382 may be formed from multiple layers of chromium silicon, of course, with different ratios of the constituents to achieve different temperature coefficients of resistance. For example, the first resistive layer 360 may include a dual layer of chromium silicon may include a first chromium silicon layer formed by PVD, for example by sputtering a target comprising 45% Si, 20% $CrB_2$, and 35% SiC by weight. The first layer may be 10 nm thick. The remaining 35% may be Boron, Carbon, or other elements. The dual layer may then include a second chromium silicon layer formed on top of the first layer by a second PVD process, for example by sputtering a target material comprising 10% Si, 85% $CrB_2$, and 5% SiC. The second layer will therefore be 10% Si, about 80-85% Cr and the remainder a combination of boron and carbon. This chromium rich film will have a lower temperature coefficient of resistance. The second chromium silicon layer 382 may be about 5 nm thick. A process for forming these layers is described in pending U.S. patent application Nos. having Ser. Nos. 12/862,589, 12,862,594, and 12/862,599 all of which are hereby incorporated by reference in their entireties.

Depending on the resistive values selected, the first and second resistive layers 360, 382 may be formed from different combinations of layers or elemental compositions. In one embodiment, the first and second resistive layers 360, 382 are formed of chromium silicon between 5 and 15 nm thick where a ratio of chromium to silicon in the films is varied to achieve a low temperature coefficient of resistance for the first resistive layer 360 and a high temperature coefficient of resistance for the second resistive layer 382. The temperature coefficients of resistance can be altered by forming a single layer of chromium silicon or multiple layers of chromium silicon having differing concentrations of silicon.

With chromium silicon resistors, the temperature coefficient of resistance varies depending on the amount of silicon as compared to the amount of chromium. With a higher percentage of silicon a higher sheet resistance is achievable, such as 10 Kohm/sq and a higher temperature coefficient of resistance, such as approximately 3800 ppm. At the other end of the spectrum, if there is a higher percentage of chromium a lower sheet resistance is achievable, such as 1 Kohm/sq and a lower temperature coefficient of resistance, such as approximately 100 ppm.

Pure silicon may also be used for the first and second resistive layers 360, 382. For example, the silicon can be polysilicon, an amorphous silicon, or other form of silicon as deposited.

In one embodiment, the first resistive layer 360 has a low temperature coefficient of resistance over the range of temperatures at which the integrated circuit is likely to operate and the second resistive layer 382 has a high temperature coefficient of resistance. More particularly, the first, second, and fourth resistors R1, R2, R4 have a temperature coefficient of resistance that is lower than the temperature coefficient of resistance of the third resistor R3. This allows the third resistor R3 to detect changes in the ambient temperature around the device 301 containing the temperature switch 300, while the resistance of the first, second, and fourth resistors R1, R2, R4 does not fluctuate or fluctuates nominally.

The materials used for the first and second resistive layers 360, 382 may be configured to be trimmed if subjected to heat much higher than a normal operating temperature as described above, see FIGS. 7-10 for different embodiments with heaters adjacent to the resistors. This change in resistance will be a permanent or semi-permanent change because upon cooling the resistor after a heating cycle, the resistance will be a new value and semi-permanent change because the resistance is altered from the value of resistance prior to the heating cycle to the new value. The resistance of the resistors may again be altered by subjecting the resistors to higher than normal temperatures. This phenomenon is to be distinguished from the phenomenon in which the resistance of most substances varies with temperature, but generally always returns to a same value for a same temperature, the temperature coefficient of resistance.

In one embodiment, a layer of chromium silicon alloy is used for the first resistive layer 360 having around 40% silicon and 60% chromium with a sheet resistance of 10 k$\Omega$/sq in an unaltered state and a thickness of 15 nm. The temperature coefficient of resistance is very small, and ideally 0%/° C. over a temperature range of normal integrated circuit operation of 0° C. to 100° C. Thus advantageously, the resistance of the first resistive layer 360 changes very little with temperature in the normal operating temperature range, but can be permanently or semi-permanently altered by raising the temperature of the first resistive layer 360 substantially higher than the normal operating temperature then cooling it again with a heater.

When heated by the heater, the chromium silicon undergoes a permanent or semi-permanent change in resistance when subjected to temperatures higher than 400° C.-500° C. for the duration of time, such as 1 millisecond. When the resistor cools to a normal operating temperature after the programming cycle, the resistance is a new and different value. The new value will stay at this value for the life of the resistor, unless it is programmed or heated above normal operating temperatures again. In some embodiments, the thermal processing is performed with pulses of current instead of a steady flow of current to reach the temperature. The resistance of the chromium silicon first resistive layer 360 may increase or decrease when subjected to a particular heating cycle. Processes for altering the resistance of thin film resistors by heating cycles are detailed in U.S. patent application Ser. No. 12/562,026 published as U.S. Patent Publication No. 2010-073122 A1, which is hereby incorporated by reference in its entirety.

The material of the first heater 350 is generally different from the resistive material of the third resistor R3. The material of the first heater 350 is selected to generate a large amount of heat when a current passes through it. Because the first heater 350 will generate and be subject to large amounts of heat, the resistive material of the first heater 350 is selected to be able to withstand high temperatures and stresses. Therefore, in a one embodiment, the first heater 350 is a refractory metal able to withstand high temperatures and currents without degrading. Refractory metals are able to sustain, in a controlled manner, a high temperature during heating. Furthermore, refractory metals are in general resistant to electromigration of atoms when high currents pass through them. In one embodiment, the refractory metal is deposited by a PVD process such as sputtering or evaporation. Other suitable thin film techniques may also be used to form the first heater 350.

For example, the thin film first heater 350 is formed from a tantalum aluminum (TaAl) thin film. The thickness of the TaAl thin film first heater 350 is about 25 nm. The TaAl thin film first heater 350 has a sheet resistance of about 100Ω/sq for a total resistance of about 500Ω (thus it is five squares). The material of the thin film first heater 350 may be selected from other refractory metals including but not limited to TaSiN, TaN, and W.

The trimming of the third resistor R3 by the first heater 350 can be performed by the manufacturer before packaging or by the customer after purchase of a device packaged with the temperature sensor 300. As mentioned below with respect to FIG. 9, all of the resistors may be trimmed by respective heaters. This allows greater flexibility with the resistance of the resistors which tunes the Wheatstone bridge 302 and thus the output. It also gives more control to the consumer, which allows a wider application of the device to the consumer's needs. In addition, space on a wafer during manufacturing is saved because the resistors R1, R2, R3, and R4 are formed with a specific small size and the resistance is changed by the heater, instead of having to start with a large surface area and trimming the resistors by laser or other trimming method.

The resistors may be one time programmable or may be reprogrammed. More particularly, the resistance of the resistors may be changed more than one time by the manufacturer or the end user. This allows the user more control and greater flexibility in the temperature ranges in which a device should operate or shut down.

The thermal processing heats the third resistor R3 to a temperature above what the third resistor R3 would normally experience during standard operation of the device 301. Typically, the device 301 will not reach temperatures higher than 75° C. during normal operating conditions after processing, packaging, and testing has been completed. The third resistor R3 is thermally separated from the parts of the device that generate heat during operation to avoid these parts triggering a response with the third resistor R3.

A fourth dielectric 386 is formed over the third resistor R3 and the first heater 350. The fourth dielectric 386 is configured to have a high thermal conductivity so that the third resistor R3 can detect a change in the ambient temperature around the device 301. For example, the fourth dielectric layer 386 may be silicon nitride, which will allow the ambient temperature to reach the third temperature sensitive resistor R3. The fourth dielectric layer 386 may be the final layer of passivation so that the third resistor R3 is as close as possible to the external environment of the semiconductor device 301.

In FIG. 5, the proximity of the third resistor R3 to the exterior of the device 301 is constrained by a height 388 of the third interconnect structures 380. In alternative embodiments, the third resistor R3 is configured to be closer to the environmental conditions to more easily detect a change in the temperature. For example, in FIG. 10 the heater 408 is formed below the third resistor R3 and all of the interconnect structures are formed on the same level.

The connections 362, 364, 366, 368, 370, and 372 that couple the second interconnect structures 354 to the nodes N1, N2, N3, and N4 of the Wheatstone bridge 302 may be formed in a variety of ways. For example, the first node N1 may be formed by extending the first one of the second interconnect structures 354a to extend towards the sixth one of the second interconnect structures 354f. The fourth node may be formed by extending the fifth one of the second interconnect structures 354e to extend beneath the second one of the third interconnect structures 380b. Then, prior to forming the third interconnect structures 380, a connection 374 is formed as a conductive plug to couple the fifth one of the second interconnect structures 354e to the second one of the third interconnect structures 380b. In this embodiment, the connection 370 would not be formed as a conductive plug and would instead be the extension of the second interconnect structure.

In an alternative embodiment, the nodes N1, N2, N3, and N4 may be formed as another metal level such that an additional set of interconnect structures formed between the second and third interconnect structures, not shown in cross-section. Connections 362, 364, 366, 368, 370, 372, 374, and 376 could be formed as conductive plugs extending between the respective interconnect structures to form the nodes N1, N2, N3, and N4. Other conductive plugs and interconnect structures may be formed to connect the Wheatstone bridge 302 to contacts and other components in the semiconductor device 301, which are not shown in the figures.

For simplicity, the transistors 324, 326, 328, the conductive plugs 340, 352 from the transistors 324, 326, 328, and the first interconnect structures 342 are not shown in FIGS. 6-10. The variations in these figures are in how the various heaters and resistors are formed.

As mentioned above, FIG. 6 is a cross-sectional view of FIG. 4 through 6-6. The cross section is through the third resistor R3, the heater 350, and the second resistor R2. An interlevel dielectric layer 349 is representative of these previously formed layers and active circuitry that are not shown. The first interlevel dielectric layer 349 is planarized by CMP or other process to remove any uneven topology.

The second resistor R2 is formed on the second interlevel dielectric 348, which is represented by the dielectric layer 349 in FIG. 6. The third interlevel dielectric layer 378 is formed over the second resistor R2 and the first and fourth resistors R1 and R4. The third resistor R3 is formed on the third interlevel dielectric layer 378 and couples to the third and fourth ones of the second interconnect structures 354c, 354d, as shown in FIG. 5. Nodes N1 and N3 may be formed in the same process as the second interconnect structures 354c, 354d. After the third resistor is formed, the nodes N1 and N3 may be etched to remove excess portions of the third resistor R3, the first thermally conductive dielectric layer 384, and the heater 350.

The third resistor R3 is covered and protected by the first thermally conductive dielectric layer 384. Openings 385 are formed through the first thermally conductive dielectric layer 384 to provide access to the third interconnect structures 380c, 380d to which the first heater 350 connects. The first heater 350 is formed from the thin film layer 351. In this embodiment, the thin film layer 351 and the first thermally conductive dielectric layer 384 are patterned and etched together. In other embodiments, the first thermally conductive layer 348 may only cover a portion of the third resistor R3, see FIG. 7. After the first heater 350 is formed, the fourth dielectric 386 is formed.

Figure 7:
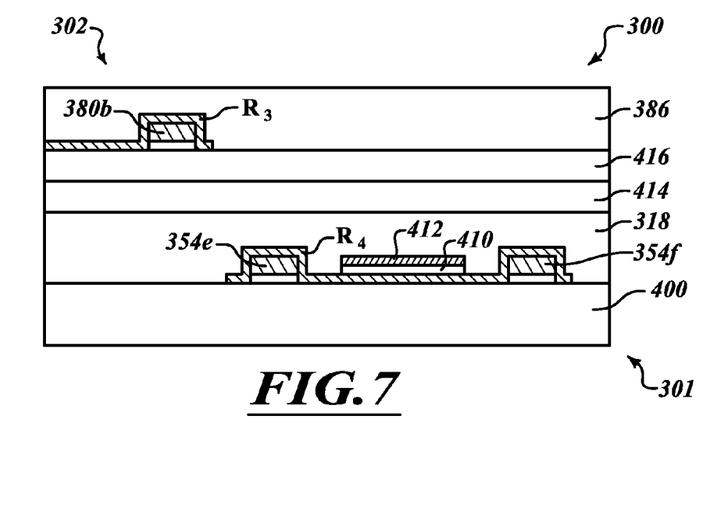
FIG. 7 is an enlarged cross-sectional view of a portion of an embodiment of a temperature switch formed in accordance with the present disclosure.

FIG. 7 is an enhanced view of an alternative embodiment of the fourth resistor R4 and a portion of the third resistor R3 of FIGS. 4-6. As with FIG. 6, the semiconductor device 301 of FIG. 7 includes active circuitry and other components, such as those shown in FIG. 5. For simplicity, the active circuitry and other components are represented by layer 400. The fifth and sixth interconnect structures 354e, 354f are formed on the layer 400. In this embodiment, a second thermally conductive dielectric layer 410 is formed over the fourth resistor R4. A second heater 412 is formed over the second thermally conductive dielectric layer 410. The second heater 412 is configured to trim the resistance of the fourth resistor R4 by thermally processing the fourth resistor. The thermal processing of the fourth resistor can be executed as described above with respect to the thermally processing of the third resistor R3 with the first heater 350.

After forming the second heater 412, the third interlevel dielectric layer 378 is formed over the second heater 412 and the fourth resistor R4. In this embodiment, two additional thermally and electrically non-conductive layers 414 and 416 are formed. These two additional non-conductive layers 414, 416 provide additional isolation of the third resistor R3 from the other resistors of the Wheatstone bridge 302 and the active circuitry 320. The two non-conductive layers 414, 416 may be planarized or otherwise smoothed to remove uneven topology. The non-conductive layers 414, 416 may be formed of silicon dioxide, a nanoporous material, an aerogel, or any other suitable material that is thermally and electrically isolating. Silicon dioxide has a low thermal conductivity (about 1 W/m/K) and thus serves to inhibit heat transfer from the heaters to other structures, such as the transistors. Aerogels and nanoporous layers are also good thermal insulators.

The third resistor R3 is formed over the third interconnect structures 380b and on the top non-conductive layer 416. In this embodiment, the first heater 350 is formed in a manner similar to the second heater 412, i.e. the first heater 350 and the first thermally conductive dielectric layer 384 are the same size and are not shown in this cross section.

Figure 8:
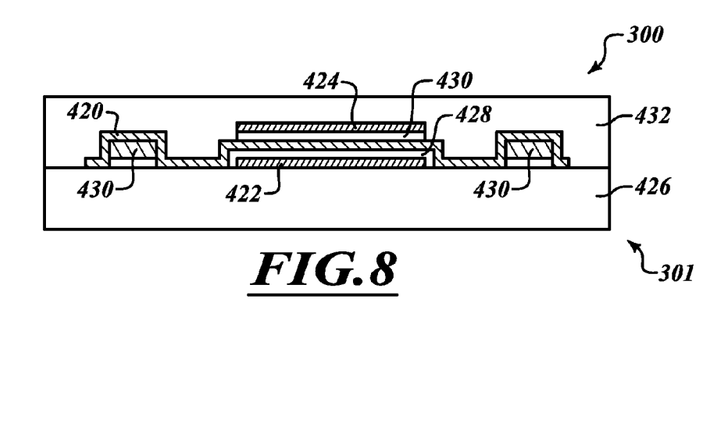
FIG. 8 is a simplified embodiment of a resistor between two heaters in accordance with an embodiment of the present disclosure.

FIG. 8 is an alternative embodiment of a resistor 420 adjacent to a first and a second heater 422, 424. The resistor 420 could be any one or all of the resistors R1, R2, R3, or R4. The first heater 422 is formed on a first dielectric layer 426, which is representative of a substrate, active circuitry, and other components such as those described above with respect to FIG. 5. The first heater 422 is formed to couple to first interconnect structures (not shown). The interconnect structures can be formed on, above, or below the first dielectric layer 426 as shown in the various embodiments of the present disclosure.

The first heater 422 is covered by a first thermally conductive dielectric 428. Second interconnect structures 430 are formed on the first dielectric layer 426 and provide the electrical connects for the resistor 420. The first interconnect structures (not shown) may be formed at the same time as the second interconnect structures 430.

After the resistor 420 is formed, a second thermally conductive dielectric layer 430 is formed over the resistor 420 and the second heater is formed over the second thermally conductive dielectric layer 430. The second heater 422 is coupled to third interconnect structures, not shown, which may be formed on, above, or below the first dielectric layer 426. For example, the first heater 422 may be coupled to the first interconnect structures, which may be positioned closer to the resistor 420. The second heater 424 may be coupled to the third interconnect structures, which may be positioned further from the resistor 420 than the first interconnect structures. In one embodiment, the first, second, and third interconnect structures are all formed on the same level.

A dielectric layer 432, such as the third interlevel dielectric 378 or the fourth dielectric 386 is formed over the first and second heater 422, 424 and the resistor 420.

Selecting different materials or compositions of the materials for the heaters and the resistors gives the customer a wider range of temperatures achievable by the first heater 350a in FIGS. 4-6 or the first and second heaters 422, 424 in FIG. 8. The embodiment in FIG. 8 includes two heaters for each resistor. This would allow greater control of the temperatures for trimming the resistors. For example, the first heater may be configured to achieve a first programming temperature that is configured to program the resistor to respond to a first threshold temperature and the second heater may be configured to achieve a second programming temperature that is configured to program the resistor to respond to a second threshold temperature. In addition, the first and second heaters may be used simultaneously to achieve a third programming temperature that is higher than the first and second programming temperatures.

Figure 9:
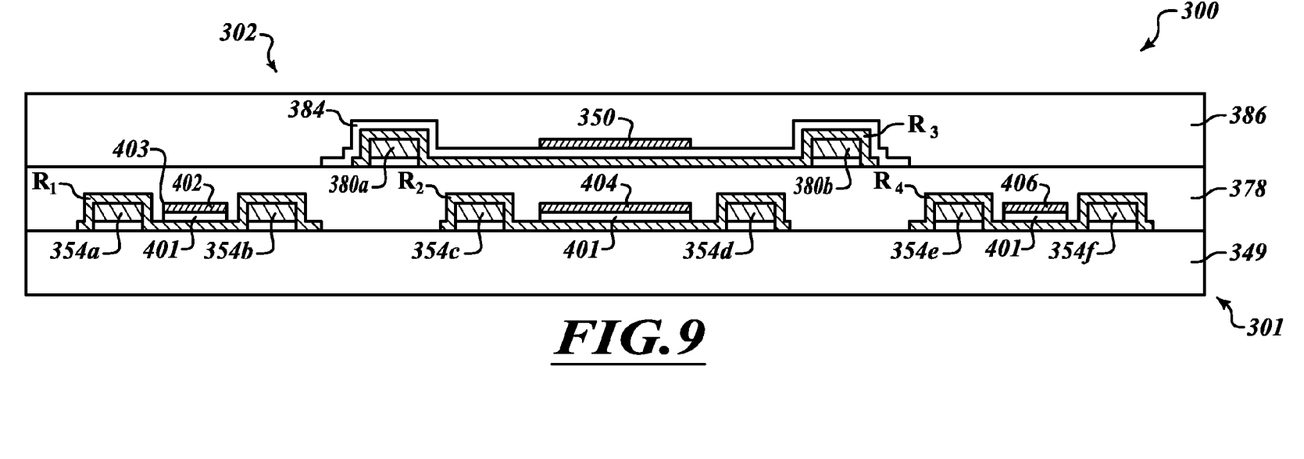
FIGS. 9 and 10 are cross-sectional views of alternative embodiments of a Wheatstone bridge of a temperature switch formed in accordance with the present disclosure.

FIG. 9 is yet another embodiment of the Wheatstone bridge 302 of the temperature sensor 300 formed as a component of the semiconductor device 301. In this embodiment, each resistor R1, R2, R3, and R4 has an integrated heater, 402, 404, 350, and 406, respectively. The first, second, and fourth resistors R1, R2, R4 are formed in accordance with the methods described above with respect to FIG. 5.

The interlevel dielectric layer 349 is representative of the previously formed layers and active circuitry that are not shown in the cross section of FIG. 9. The first interlevel dielectric layer 349 is planarized by CMP or other process to remove any uneven topology. Subsequently, the second interconnect structures 354a-f are formed on the interlevel dielectric layer 349 and the first thin film resistive layer 360 is formed on the second interconnect structures 354a-f.

Once the first, second, and fourth resistors are formed the plurality of heaters 402, 404, 406 are formed. These heaters 402, 404, 406 are formed in a manner similar to the second heater 412 of FIG. 7. More particularly, a thermally conductive dielectric layer 401 is deposited over the first, second, and fourth resistors R1, R2, R4. Then a first thin film heater layer 403 is formed over the thermally conductive dielectric layer 401. The first thin film heater layer 403 and the thermally conductive dielectric layer 401 are patterned and etched to form the first heater 402 associated with the first resistor R1, the second heater 404 associated with the second resistor R2, and the fourth heater 406 associated with the fourth resistor R4.

The third interlevel dielectric layer 378 is formed over the heaters 402, 404, and 406, the first, second, and fourth resistors R1, R2, R4, and the interlevel dielectric 349. The third resistor R3 and the third heater 350 are formed in the manner described above with respect to FIG. 5.

As mentioned above, the integrated heaters 402, 404, 350, and 406 are configured to be activated before or after packaging of the semiconductor device, which provides more flexibility and greater control of the ultimate resistance values of the resistors of the Wheatstone bridge 302. For example, a consumer could purchase the packaged semiconductor device and then trim the resistances of the Wheatstone bridge 302 after the package has been coupled to a printed circuit board. The consumer can select and set resistances specific for their intended application by altering the resistances by activating the integrated heaters 402, 404, 350, and 406 for a selected time period.

Figure 10:
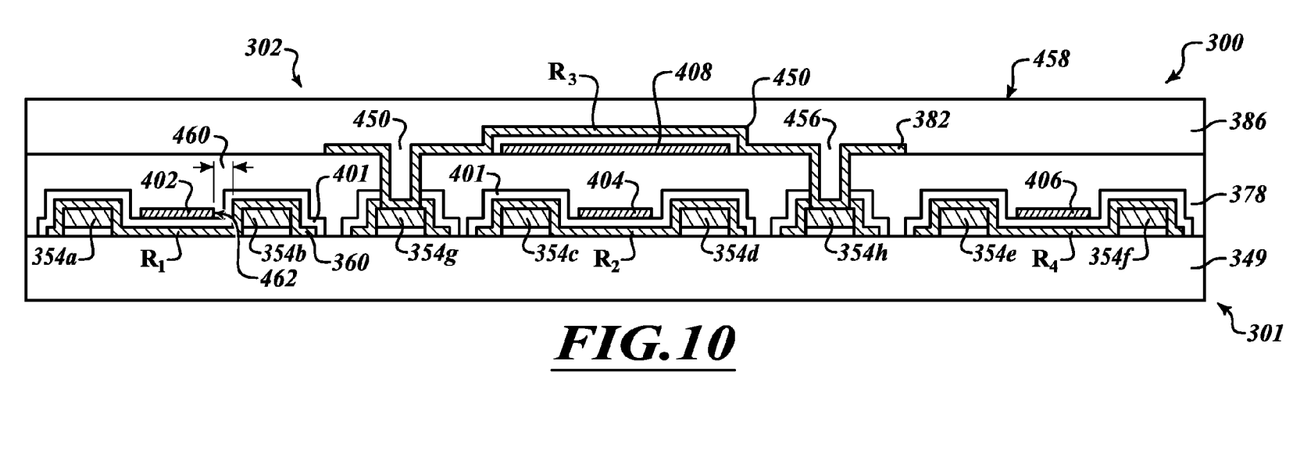

FIG. 10 is an alternative embodiment of the Wheatstone bridge 302, this is configured to position the third resistor R3 closer to the ambient environmental conditions. In this embodiment, all of the interconnect structures are formed on the same metal level. More particularly, additional second interconnect structures 354g, 354h associated with the third resistor R3 are formed as the second interconnect structures 354a-f are formed for connection to the first, second, and fourth resistors R1, R2, R4 are formed.

The second interconnect structures 354a-g are formed in accordance with methods described above. The second interconnect structures 354a-g are formed on the interlevel dielectric 349, which is a simplified view of the active circuitry and other components of the semiconductor device 301. Subsequently, the first resistive layer 360 is formed over all of the second interconnect structures 354a-g. The first resistive layer 360 is patterned and etched to define the first, second, and fourth resistors R1, R2, R4. The additional second interconnect structures 354g, 354h are also covered by the first resistive layer 360, however, the etch electrically isolates the resistors from the second interconnect structures 354g, 354h.

The first thermally conductive layer 401 is formed over the first, second, and fourth resistors R1, R2, R4 and over the additional second interconnect structures 354g, 354h. In one embodiment, the first thermally conductive layer is patterned and etched to separate the resistors and the second interconnect structures 354g, 354h. Then the first thin film heater layer 403 is formed, patterned, and etched to form the first, second, and fourth heaters 402, 404, 406. The third interlevel dielectric 378 is formed over the resistors R1, R2, R4, the heaters 402, 404, 406, and the second interconnect structures 354a-g.

A fourth heater 408 is formed on the third interlevel dielectric layer by deposition, pattern, and etch of a second thin film heater layer 450. The thermally conductive dielectric layer 384 is formed over the fourth heater 408 to separate the heater 408 from the third resistor R3. The thermally conductive dielectric layer 384 may be patterned and etched or alternatively, may remain over the surface of the semiconductor device 301.

Openings 456 are formed through the third interlevel dielectric 378 to provide a contact to the additional second interconnect structures 354g, 354h, which provide the electrical control signals for the third resistor R3. The openings 456 remove portions of the first resistive layer 360 and the first thermally conductive layer 401 that remain on the second interconnect structures 354g, 354h. The second resistive layer 382 is formed over the third interlevel dielectric 378 and the fourth heater 408 and in the openings 456 to electrically connect the third resistor R3 to the second interconnect structures 354g, 354h. The fourth dielectric 386 is then formed over the third resistor R3. In this embodiment, the third resistor R3 is the closest component to a top surface 458 of the semiconductor device 301.

As mentioned above, the heaters 402, 404, 406, 408 are high k or high thermal conductivity material that are configured to also trim to change the resistance of an adjacent resistor. For example, the heaters may include tantalum aluminum.

In one embodiment, specific materials are used for the interlevel dielectric layers 349, 378, 386 to constrain the heat from the first, second, and fourth resistors R1, R2, R4 and heaters 402, 404, 406 to avoid damaging any other components in the semiconductor device 301 during thermal processing. In particular, using low k or low thermal conductivity materials will prevent the heat from flowing through the third interlevel dielectric layer 378 to the temperature sensitive resistor R3. The substrate 322, shown in FIG. 5 is a high k or high thermal conductivity material. In addition, the first, second, and fourth resistive layers R1, R2, R4 are high k materials. Accordingly, the third interlevel dielectric layers 378 should be low k or low conductivity materials, such as silicon dioxide, to prevent heat dissipation away from the resistors to the third resistor R3.

The fourth dielectric 386 is configured to transmit or otherwise conduct thermally so that the third resistor R3 can respond to changes in the temperature around the semiconductor device 301. For example, the fourth dielectric layer 386 may be silicon nitride.

In other embodiments, the heaters may also be formed in the substrate 322 (see FIG. 1 for the substrate 322). In this embodiment, the resistors would be formed on a lower level of the semiconductor device 301. The channel regions of a transistor will heat to a certain temperature when the transistor is turned on. In addition, if the heater is formed in the substrate from monocrystalline silicon, it also will heat to a selected temperature when current passes through it. Accordingly, the silicon substrate itself can be used as the heater. Alternatively, a thin film transistor formed of polysilicon can also be used as the heater. See, for example, U.S. Pat. Nos. 6,504,226 and 6,412,919 for examples of various types of such heaters.

In one embodiment, applying a 25 milliamp current to any one of the heaters 402, 404, 406, 408 will generate a localized increase in temperature to above 600 degrees Celsius. The temperature generated by the heaters 402, 404, 406 is localized, i.e., the temperature generated does not extend past a distance 460 from an outer edge 462 of the heater 402.

Figure 11:
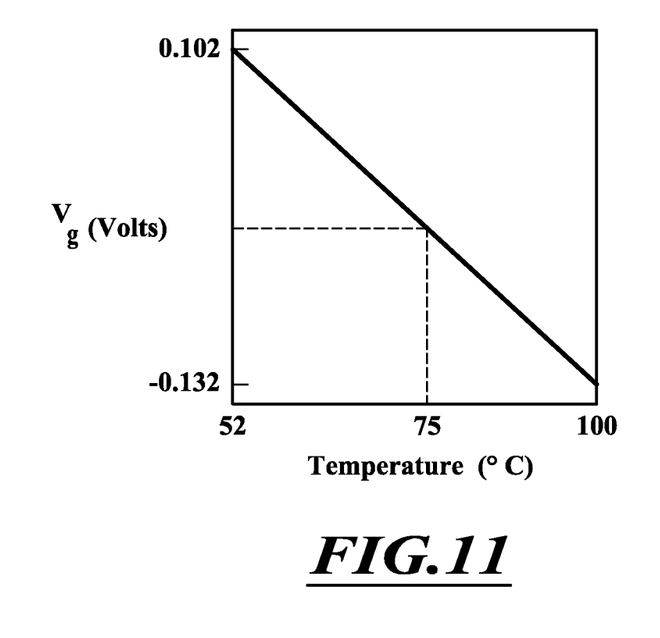
FIGS. 11 and 12 are response curves of outputs of the temperature switch of FIG. 3.
Figure 12:
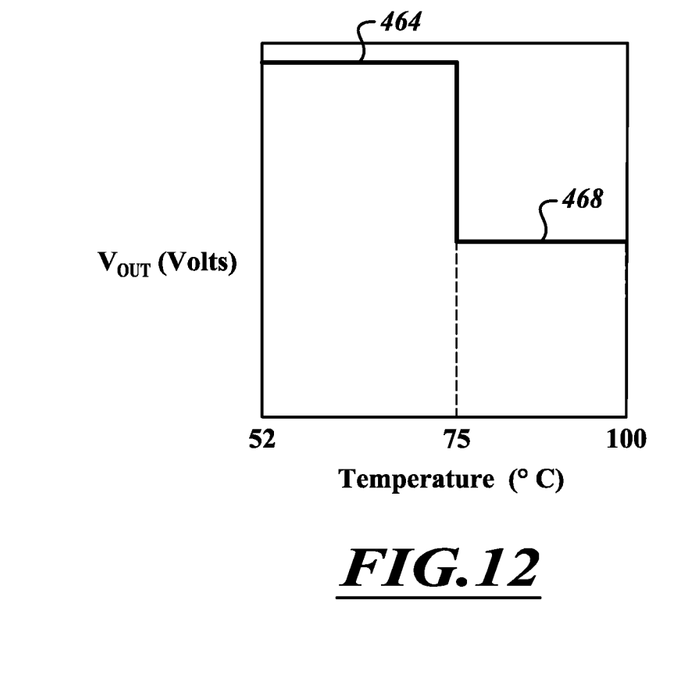

FIG. 11 is a response curve of the output voltage Vg of the temperature switch 300 of FIG. 3 and FIG. 12 is a response curve for the output Vout of the comparator 304 of FIG. 3. As the temperature increases, the output voltage Vg changes. The Wheatstone bridge 302 is programmed to respond at a certain temperature, such as 75 degrees Celsius. When the threshold temperature is reached, the output voltage becomes negative. The comparator 304 is configured to output a first value 464 when the second input 312 is greater than the first input 310 and a second value 468 when the first input 312 is greater than the second input 312. The value on the first and second inputs 312 is directly related to the output voltage Vg.

Figure 13:
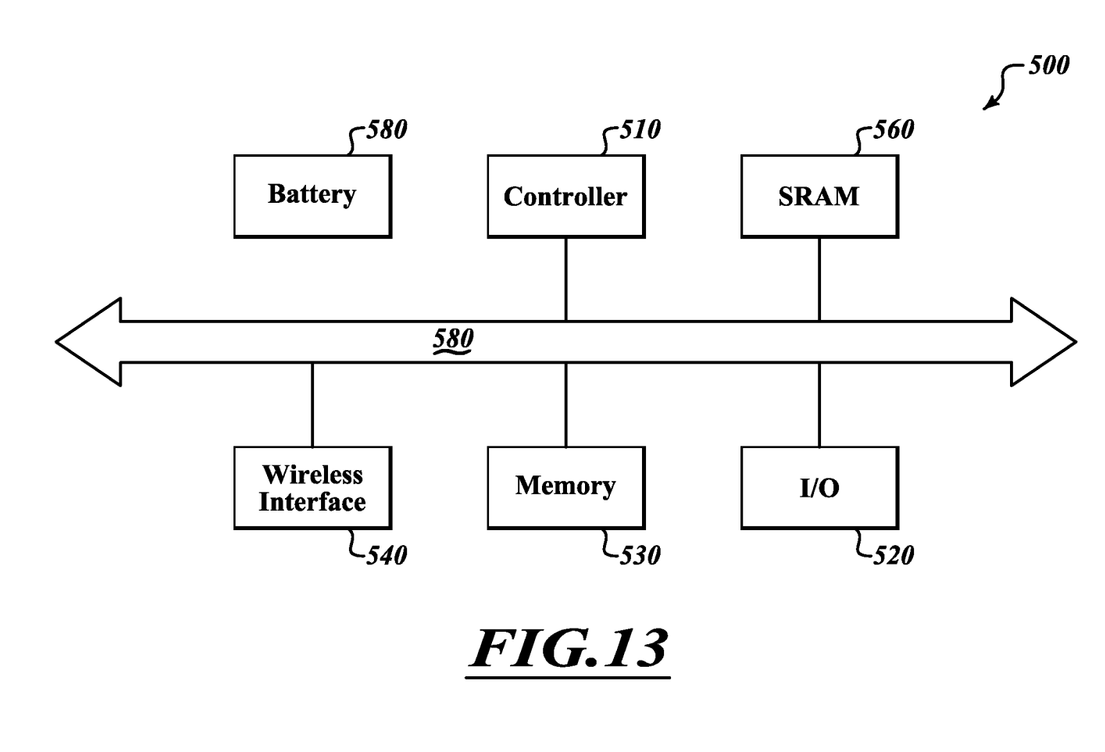
FIG. 13 is a block diagram of a system that includes a temperature switch in a controller.

Turning to FIG. 13, a portion of a system 500 in accordance with an embodiment of the present invention is described. System 500 may be used in wireless devices such as, for example, a personal digital assistant (PDA), a laptop or portable computer with wireless capability, a web tablet, a wireless telephone, a pager, an instant messaging device, a digital music player, a digital camera, or other devices that may be adapted to transmit and/or receive information wirelessly. System 500 may be used in any of the following systems: a wireless local area network (WLAN) system, a wireless personal area network (WPAN) system, a cellular network, although the scope of the present invention is not limited in this respect.

System 500 may include a controller 510, an input/output (I/O) device 520 (e.g., a keypad, display), static random access memory (SRAM) 560, a memory 530, and a wireless interface 540 coupled to each other via a bus 550. A battery 580 may be used in some embodiments. It should be noted that the scope of the present invention is not limited to embodiments having any or all of these components.

Controller 510 may comprise, for example, one or more microprocessors, digital signal processors, microcontrollers, or the like. The controller 510 may also include the temperature switch 300 that includes the Wheatstone bridge 302. Memory 530 may be used to store messages transmitted to or by system 500. Memory 530 may also optionally be used to store instructions that are executed by controller 510 during the operation of system 500, and may be used to store user data. Memory 530 may be provided by one or more different types of memory. For example, memory 530 may comprise any type of random access memory, a volatile memory, a non-volatile memory such as a flash memory and/or a memory discussed herein.

I/O device 520 may be used by a user to generate a message. System 500 may use wireless interface 540 to transmit and receive messages to and from a wireless communication network with a radio frequency (RF) signal. Examples of wireless interface 540 may include an antenna or a wireless transceiver, although the scope of the present invention is not limited in this respect.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit device, comprising:
    a die, including:
        a substrate;
        active circuitry formed on the substrate, the active circuitry including:
            a comparator formed from a plurality of transistors, the comparator having a first input and a second input;
        a Wheatstone bridge formed on the substrate above the active circuitry and electrically coupled to the active circuitry, the Wheatstone bridge including:
            a first thin film resistor coupled between a first interconnect and a second interconnect, the first resistor being temperature insensitive;
            a second thin film resistor coupled between the second interconnect and a third interconnect, the second resistor being temperature insensitive;
            a third thin film resistor coupled between the third interconnect and a fourth interconnect, the third resistor being temperature sensitive; and
            a fourth thin film resistor coupled between the first interconnect and the fourth interconnect, the fourth resistor being temperature insensitive, the second interconnect being coupled to the first input of the comparator and the fourth interconnect being coupled to the second input of the comparator.

2. The integrated circuit device of claim 1 wherein the first, second, and fourth thin film resistors have a first temperature coefficient of resistance and the third thin film resistor has a second temperature coefficient of resistance, the second temperature coefficient of resistance being greater than the first temperature coefficient of resistance.

3. The integrated circuit device of claim 1 wherein the first, second, third, and fourth thin film resistors include chromium and silicon.

4. The integrated circuit device of claim 3 wherein a ratio of chromium to silicon is greater in the first, second, and fourth thin film resistors than in the third thin film resistor.

5. The integrated circuit device of claim 1, further comprising a plurality of heaters adjacent to the first, second, third, and fourth thin film resistors, each of the plurality of heaters configured to be operated individually to change a resistance of the respective thin film resistor.

6. The integrated circuit device of claim 1, further comprising a heater adjacent to the third thin film resistor, the heater configured to change a resistance of the third thin film resistor.

7. The integrated circuit device of claim 1 wherein a resistance of each of the first, second, third, and fourth resistors is the same.

8. The integrated circuit device of claim 1, further comprising a first dielectric separating the first, second, and fourth resistors from the third resistor and a second dielectric separating the third resistor from an environment.

9. The integrated circuit device of claim 8 wherein the first dielectric has a low thermal conductivity and the second dielectric has a high thermal conductivity.

10. A method, comprising:
    forming an integrated circuit device, the forming of the device including:
        forming a Wheatstone bridge, the forming of the Wheatstone bridge including:
            forming a plurality of first interconnect structures over a substrate;
            forming a first thin film resistive layer in contact with the first interconnect structures, the first thin film resistive layer having a first temperature coefficient of resistance;
            forming a first, a second, and a third resistor by removing portions of the first thin film resistive layer;
            forming a first interlevel dielectric over the first, second, and third resistors and the first interconnect structures;
            forming a plurality of second interconnect structures over the first interlevel dielectric layer;
            forming a second thin film resistive layer in contact with the second interlevel dielectric layer, the second thin film resistive layer having a second temperature coefficient of resistance that is greater than the first temperature coefficient of resistance; and
            forming a fourth resistor by removing portions of the second thin film resistive layer.

11. The method of claim 10, further comprising:
    coupling the first resistor to the third resistor with a first interconnect;
    coupling the first resistor to the second resistor with a second interconnect;
    coupling the second resistor to the fourth resistor with a third interconnect; and
    coupling the third transistor to the fourth resistor with a fourth interconnect.

12. The method of claim 11, further comprising:
    forming a comparator having a first and a second input, the forming including:
        coupling the first input to the second interconnect; and
        coupling the second input to the fourth interconnect.

13. The method of claim 12, further comprising coupling a voltage source to the first and the third interconnects.

14. The method of claim 10, further comprising:
forming a first thermally conductive dielectric layer over the first, second, and third resistors;
forming a first heater layer over the first thermally conductive dielectric layer; and
forming a first, second, and third heater positioned over the first, second, and third resistors by removing portions of the first heater layer.

15. The method of claim 14, further comprising:
forming a second thermally conductive dielectric layer over the fourth resistor;
forming a second heater layer over the second thermally conductive dielectric layer; and
forming a fourth heater positioned over the fourth resistor by removing portions of the second heater layer.

16. A system, comprising:
a memory; and
a controller formed in a single die, the controller including:
a substrate;
active circuitry formed on the substrate, the active circuitry including a comparator having a first input and a second input;
a Wheatstone bridge formed on the substrate above the active circuitry and electrically coupled to the active circuitry, the Wheatstone bridge including:
a first thin film resistor coupled between a first interconnect and a second interconnect, the first resistor being temperature insensitive;
a second thin film resistor coupled between the second interconnect and a third interconnect, the second resistor being temperature insensitive;
a third thin film resistor coupled between the third interconnect and a fourth interconnect, the third resistor being temperature sensitive; and
a fourth thin film resistor coupled between the first interconnect and the fourth interconnect, the fourth resistor being temperature insensitive, the second interconnect being coupled to the first input of the comparator and the fourth interconnect being coupled to the second input of the comparator.

17. The system of claim 16 wherein the controller includes logic circuitry and control circuitry and the Wheatstone bridge includes a plurality of heaters positioned adjacent to at least one of the first, second, third, and fourth resistors, the control circuitry being coupled to the heaters.

18. The system of claim 16 wherein the first, second, and fourth thin film resistors have a first temperature coefficient of resistance and the third thin film resistor has a second temperature coefficient of resistance, the second temperature coefficient of resistance being greater than the first temperature coefficient of resistance.

19. The system of claim 16, further comprising a first dielectric separating the first, second and fourth resistors from the third resistor and a second dielectric separating the third resistor from an environment.

20. The system of claim 19 wherein the first dielectric has a low thermal conductivity and the second dielectric has a high thermal conductivity.

21. An integrated circuit device, comprising:
a substrate;
a Wheatstone bridge formed on the substrate, the Wheatstone bridge including:
a first thin film resistor coupled between a first interconnect and a second interconnect, the first resistor being temperature insensitive;
a second thin film resistor coupled between the second interconnect and a third interconnect, the second resistor being temperature insensitive;
a third thin film resistor coupled between the third interconnect and a fourth interconnect, the third resistor being temperature sensitive;
a fourth thin film resistor coupled between the first interconnect and the fourth interconnect, the fourth resistor being temperature insensitive; and
a first dielectric separating the first, second, and fourth resistors from the third resistor and a second dielectric separating the third resistor from an environment;
a voltage source formed on the substrate and coupled between the first and the third interconnects; and
a comparator formed on the substrate and having a first input coupled to the second interconnect, a second input coupled to the fourth interconnect, and an output.

22. The device of claim 21, further comprising a plurality of heaters adjacent to the first, second, third, and fourth thin film resistors, each of the plurality of heaters configured to be operated individually to change a resistance of the respective thin film resistor.

23. The device of claim 21, further comprising a heater adjacent to the third thin film resistor, the heater configured to change a resistance of the third thin film resistor.

* * * * *